United States Patent
Papasakellariou et al.

(10) Patent No.: US 9,686,782 B2
(45) Date of Patent: *Jun. 20, 2017

(54) ADAPTING A NUMBER OF AGGREGATION LEVELS FOR CONTROL CHANNEL ELEMENTS

(71) Applicant: Samsung Electronics Co., Ltd., Gyeonggi-do (KR)

(72) Inventors: Aris Papasakellariou, Houston, TX (US); Hyoung-Ju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,123

(22) Filed: Sep. 21, 2015

(65) Prior Publication Data

US 2016/0014739 A1 Jan. 14, 2016

Related U.S. Application Data

(63) Continuation of application No. 14/017,934, filed on Sep. 4, 2013, now Pat. No. 9,161,354.

(60) Provisional application No. 61/696,501, filed on Sep. 4, 2012.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04W 72/0446* (2013.01)

(58) Field of Classification Search
CPC ............ H04W 72/042; H04W 72/0446; H04L 5/0053
See application file for complete search history.

(56) References Cited

U.S. PATENT DOCUMENTS

| 2012/0051306 A1 | 3/2012 | Chung et al. |
| 2012/0201216 A1 | 8/2012 | Wu |
| 2014/0050187 A1 | 2/2014 | Nakshima et al. |
| 2015/0139104 A1* | 5/2015 | Seo ...................... H04W 72/042 370/329 |
| 2015/0139109 A1* | 5/2015 | Seo ...................... H04W 72/042 370/329 |

FOREIGN PATENT DOCUMENTS

GB   EP 2693677 A1 *  2/2012   ............... H04L 5/00

OTHER PUBLICATIONS

PDCCH Construction—Hongyan—Expert Opinion—LTE University, May 20, 2011.*
Sharp, "CCE Aggregation Levels for ePDCCH", R1-123265, 3GPP TSG RAN WG1 Meeting #70, Aug. 13-17, 2012.
CMCC, "E-CCE/E-REG Definition and Fallback Operation for Signaling Independent Mapping", R1-122713, 3GPP TSG-RAN WG1 #69, May 21-25, 2012.
(Continued)

*Primary Examiner* — Jianye Wu
(74) *Attorney, Agent, or Firm* — The Farrell Law Firm, P.C.

(57) ABSTRACT

Methods and apparatuses are provided for a User Equipment (UE) to receive control information. A downlink bandwidth and a Downlink Control Information (DCI) format to be monitored are identified. An aggregation level is identified based on the identified downlink bandwidth and the identified DCI format. Control information is received based on the identified aggregation level.

16 Claims, 12 Drawing Sheets

(56) References Cited

OTHER PUBLICATIONS

Renesas Mobile Europe Ltd, "Number of eCCEs and eREGs", R1-123583, 3GPP TSG-RAN WG1 Meeting #70, Aug. 13-17, 2012.
LG Electronics, "On the Working Assumption of the Threshold for EPDCCH Search Space", R1-123972, 3GPP TSG RAN WG1 Meeting #70, Aug. 13-17, 2012.
CMCC, "eCCE/eREG Definition for Signaling Independent Mapping", R1-123738, 3GPP TSG-RAN WG1 #70, Aug. 13-17, 2012.
Nokia, Nokia Siemens Networks, "Considerations on Search Spaces", R1-123653, 3GPP TSG RAN WG1 Meeting #70, Aug. 13-17, 2012.
ZTE, "Discussion on ePDCCH Candidates and Search Space Design", R1-123374, 3GPP TSG RAN WG1 Meeting #70, Aug. 13-17, 2012.
LG Electronics, "Discussion on ECCE Definition", R1-123525, 3GPP TSG RAN WG1 Meeting #70, Aug. 13-17, 2012.
Nokia, Nokia Siemens Networks, "eREG/eCCE Mapping for ePDCCH", R1-123651, 3GPP TSG RAN WG1 Meeting #70, Aug. 13-17, 2012.
ZTE Corporation, "Mapping Design for Enhanced PDCCH", R1-121055, 3GPP TSG RAN WG1 Meeting #68bis, Mar. 26-30, 2012.
LG Electronics, "On the Working Assumption of the Threshold for EPDCCH Search Space", R1-124000, 3GPP TSG RAN WG1 Meeting #70, Aug. 13-17, 2012.
Samsung, "ECCE Aggregation Levels and RE Threshold in a PRB Pair", R1-124377, 3GPP TSG RAN WG1 #70bis, Oct. 8-12, 2012.
European Search Report dated Aug. 31, 2015 issued in counterpart application No. 13182318.9-1851, 14 pages.

\* cited by examiner

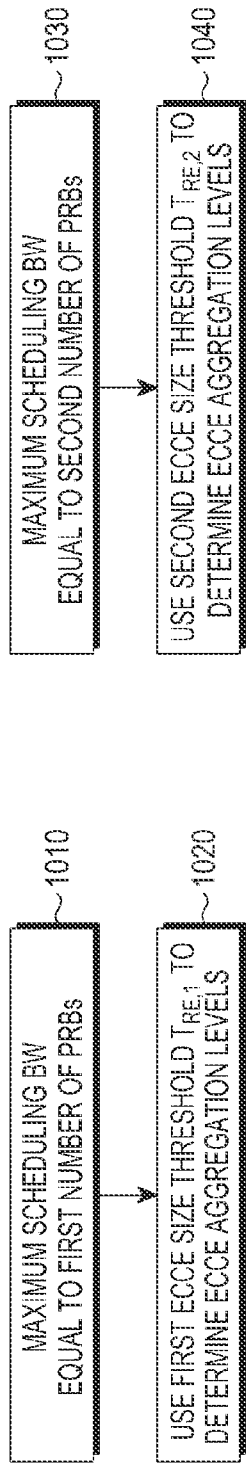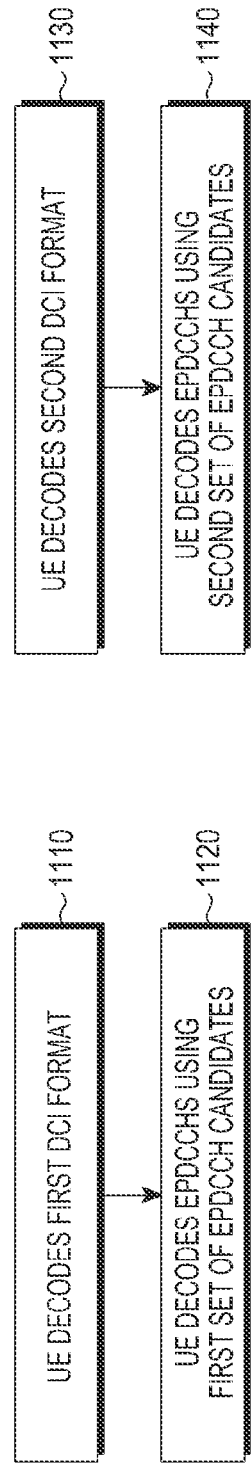
FIG. 10
FIG. 11

ADAPTING A NUMBER OF AGGREGATION LEVELS FOR CONTROL CHANNEL ELEMENTS

PRIORITY

This application is a Continuation Application of U.S. patent application Ser. No. 14/017,934, filed on Sep. 4, 2013, which claims priority under 35 U.S.C. §119(e) to U.S. Provisional Application No. 61/696,501, which was filed in the United States Patent and Trademark Office on Sep. 4, 2012, the contents of which are incorporated herein by reference.

BACKGROUND OF THE INVENTION

1. Field of the Invention

The present invention relates generally to wireless communication systems and, more specifically, to the transmission and reception of Physical DownLink Control CHannels (PDCCHs).

2. Description of the Art

A conventional communication system includes a DL that conveys transmission signals from transmission points such as Base Stations (BS or NodeBs) to User Equipments (UEs) and an UpLink (UL) that conveys transmission signals from UEs to reception points such as NodeBs. A UE, also known as a terminal or a mobile station, is fixed or mobile and is a cellular phone or a Personal Computer device, for example. A NodeB, also known as an access point, is generally a fixed station.

DL signals include data signals carrying information content, control signals carrying DL Control Information (DCI), and Reference Signals (RSs), which are also known as pilot signals. A NodeB transmits data information or DCI to UEs through respective Physical DL Shared CHannels (PDSCHs) or PDCCHs.

UL signals also include data signals, control signals and RSs. A UE transmits data information or UL Control Information (UCI) to a NodeB through a respective Physical Uplink Shared CHannel (PUSCH) or a Physical Uplink Control CHannel (PUCCH).

A PDSCH transmission to a UE or a PUSCH transmission from a UE is in response to dynamic scheduling or to Semi-Persistent Scheduling (SPS). With dynamic scheduling, a NodeB conveys to a UE a DCI format through a respective PDCCH. With SPS, a PDSCH or a PUSCH transmission is configured to a UE by a NodeB through higher layer signaling, such as Radio Resource Control (RRC) signaling, in which case the scheduling occurs at time instances and with parameters instructed by the higher layer signaling.

A NodeB may also transmit multiple types of RSs including a UE-Common RS (CRS), a Channel State Information RS (CSI-RS), and a DeModulation RS (DMRS). A CRS is transmitted over substantially an entire DL system BandWidth (BW) and can be used by all UEs to demodulate data, control signals, or perform measurements. To reduce an overhead associated with a CRS, a NodeB may transmit a CSI-RS with a smaller density in a time and/or frequency domain than a CRS for UEs to perform measurements, and transmit a DMRS only in a BW of a respective PDSCH. A UE can use a DMRS to demodulate information in a PDSCH.

FIG. 1 illustrates a conventional transmission structure for a DL Transmission Time Interval (TTI).

Referring to FIG. 1, a DL TTI includes one subframe 110 which includes two slots 120 and a total of $N_{symb}^{DL}$ symbols for transmitting data information, DCI, or RS. First $M_{symb}^{DL}$ subframe symbols are used to transmit PDCCHs and other control channels (not shown) 130. Remaining $N_{symb}^{DL} - M_{symb}^{DL}$ subframe symbols are primarily used to transmit PDSCHs 140. A transmission BW includes frequency resource units referred to as Resource Blocks (RBs). Each RB includes $N_{sc}^{RB}$ sub-carriers, or Resource Elements (REs), and a UE is allocated $M_{PDSCH}$ RBs for a total of $M_{sc}^{PDSCH} = M_{PDSCH} \cdot N_{sc}^{RB}$ REs for a PDSCH transmission BW. An allocation of one RB in a frequency domain and of one slot and two slots (one subframe) in a time domain will be referred to as a Physical RB (PRB) and a PRB pair, respectively. Some REs in some symbols contain CRS 150, CSI-RS or DMRS.

DCI can serve several purposes. A DCI format in a respective PDCCH may schedule a PDSCH or a PUSCH providing data or control information to or from a UE, respectively. Another DCI format in a respective PDCCH may schedule a PDSCH providing System Information (SI) to a group of UEs for network configuration parameters, a response to a Random Access (RA) by UEs, or paging information, for example. Another DCI format may provide Transmission Power Control (TPC) commands to a group of UEs for SPS transmissions in respective PUSCHs or PUCCHs.

A DCI format includes Cyclic Redundancy Check (CRC) bits in order for a UE to confirm a correct detection. The DCI format type is identified by a Radio Network Temporary Identifier (RNTI) that scrambles the CRC bits. The RNTI is a Cell RNTI (C-RNTI) for a DCI format scheduling a PDSCH or a PUSCH to a single UE. The RNTI is an SI-RNTI for a DCI format scheduling a PDSCH conveying SI to a group of UEs. The RNTI is an RA-RNTI for a DCI format scheduling a PDSCH providing a response to a RA from a group of UEs. The RNTI is a P-RNTI for a DCI format scheduling a PDSCH paging a group of UEs. The RNTI is a TPC-RNTI for a DCI format providing TPC commands to a group of UEs. Each RNTI type is configured to a UE through higher layer signaling from a NodeB (and the C-RNTI is unique for each UE).

FIG. 2 illustrates a conventional encoding and transmission process for a DCI format at a NodeB transmitter.

Referring to FIG. 2, an RNTI of a DCI format masks a CRC of a codeword in order to enable a UE to identify a DCI format type. A CRC 220 of (non-coded) DCI format bits 210 is computed and is subsequently masked 230 using an eXclusive OR (XOR) operation between CRC and RNTI bits 240, which is XOR(0,0)=0, XOR(0,1)=1, XOR(1,0)=1, XOR(1,1)=0 . A masked CRC is then appended to DCI format bits 250, channel coding is performed 260 such as by using a convolutional code, rate matching 270 is performed to allocated resources, and modulation 280 and transmission of a control signal 290 are performed by interleaving. For example, both a CRC and an RNTI include 16 bits.

FIG. 3 illustrates a conventional reception and decoding process for a DCI format at a UE receiver.

Referring to FIG. 3, a received control signal in step 310 is demodulated and resulting bits are de-interleaved in step 320, a rate matching applied at a NodeB transmitter is restored in step 330, and control information is subsequently decoded 340. DCI format bits in step 360 are then obtained after extracting CRC bits in step 350 which are then de-masked in step 370 through an XOR operation with an RNTI in step 380. A UE then performs a CRC test in step 390. If a CRC test passes, a UE considers the DCI format to be valid and determines parameters for PDSCH reception or PUSCH transmission. If a CRC test does not pass, a UE disregards a presumed DCI format.

A NodeB separately codes and transmits a DCI format in a respective PDCCH. To avoid a first PDCCH transmission blocking a second PDCCH transmission, a location of each PDCCH in a DL control region is not unique. Consequently, a UE needs to perform multiple decoding operations per subframe to determine whether there is a PDCCH intended for the UE. REs carrying a PDCCH are grouped into Control Channel Elements (CCEs) in a logical domain. CCE aggregation levels may include, for example, 1, 2, 4, and 8 CCEs.

FIG. 4 illustrates a conventional transmission process of DCI formats in respective PDCCHs.

Referring to FIG. 4, encoded DCI format bits are mapped to PDCCH CCEs in a logical domain. A first 4 CCEs (L=4), CCE1 401, CCE2 402, CCE3 403, and CCE4 404 are used to transmit a PDCCH to UE1. The following 2 CCEs (L=2), CCE5 411 and CCE6 412, are used to transmit a PDCCH to UE2. The following 2 CCEs (L=2), CCE7 421 and CCE8 422, are used to transmit a PDCCH to UE3. A last CCE (L=1), CCE9 431, is used to transmit a PDCCH to UE4. DCI format bits are scrambled in step 440 by a binary scrambling code and are subsequently modulated in step 450. Each CCE is further divided into Resource Element Groups (REGs). For example, a CCE consisting of 36 REs is divided into 9 REGs, each consisting of 4 REs. Interleaving in step 460, for example block interleaving, is applied among REGs which, assuming Quadrature Phase Shift Keying (QPSK) modulation for a PDCCH, include blocks of 4 QPSK symbols. A resulting series of QPSK symbols is shifted by J symbols in step 470, and each QPSK symbol is mapped to an RE in step 480 in a control region of a DL subframe. Therefore, in addition to the CRS, 491 and 492, and other control channels (not shown), REs in a DL control region contain QPSK symbols corresponding to DCI format for UE1 494, UE2 495, UE3 496, and UE4 497.

For a PDCCH decoding process, a UE may determine a search space for candidate PDCCH transmissions after it restores CCEs in a logical domain according to a UE-common set of CCEs (Common Search Space or CSS) and according to a UE-dedicated set of CCEs (UE-Dedicated Search Space or UE-DSS). A CSS may include first C CCEs in a logical domain, which is used to transmit PDCCHs for DCI formats associated with UE-common control information and use a SI-RNTI, a P-RNTI, a TPC-RNTI, to scramble respective CRCs. A UE-DSS includes remaining CCEs, which are used to transmit PDCCHs for DCI formats associated with UE-specific control information and use respective C-RNTIs to scramble respective CRCs.

CCEs of a UE-DSS is determined according to a pseudo-random function having as inputs UE-common parameters, such as a subframe number or a total number of CCEs in a subframe, and UE-specific parameters such as a C-RNTI. For example, for CCE aggregation level of $L \in \{1,2,4,8\}$ CCEs, the CCEs corresponding to PDCCH candidate m are given by CCEs for PDCCH candidate $m=L \cdot \{(Y_k+m) \mod \lfloor N_{CCE,k}/L \rfloor\}+i$      Equation 1 where $N_{CCE,k}$ is a total number of CCEs in subframe k, i=0, . . . , L−1, m=0, . . . , $M_C^{(L)}$−1, and $m_C^{(L)}$ is a number of PDCCH candidates to monitor in a UE-DSS. Values of $M_C^{(O)}$ for $L \in \{1,2,4,8\}$ are, respectively, {6, 6, 2, 2}, for example. For a UE-DSS, $Y_k=(A \cdot Y_{k-1}) \mod D$ where $Y_{-1}=$C-RNTI≠0, A=39827 and D=65537. For a CSS, $Y_k=0$.

A conventional DL control region may occupy a maximum of $M_{symb}^{DL}=3$ subframe symbols and a PDCCH is transmitted substantially over an entire DL BW. Consequently, network functionalities such as extended PDCCH capacity in a subframe and PDCCH interference coordination in a frequency domain, which are needed in several cases, cannot be supported. One such case is a use of Remote Radio Heads (RRHs) in a network where a UE may receive DL signals either from a macro-NodeB or from an RRH. If RRHs and a macro-NodeB share a same cell identity, cell-splitting gains do not exist and expanded PDCCH capacity is needed to accommodate PDCCH transmissions from both a macro-NodeB and RRHs. Another case is for heterogeneous networks where DL signals from a pico-NodeB experience strong interference from DL signals from a macro-NodeB, and interference coordination in a frequency domain among NodeBs is needed.

A direct extension of a conventional DL control region size to more than $M_{symb}^{DL}=3$ subframe symbols is not possible at least due to a need for support of conventional UEs, which cannot be aware or support such extension. An alternative is to support DL control signaling in a PDSCH region by using individual PRB pairs. A PDCCH transmitted in one or more PRB pairs of a conventional PDSCH region will be referred to as Enhanced PDCCH (EPDCCH).

FIG. 5 illustrates a conventional EPDCCH transmission structure in a DL subframe.

Referring to FIG. 5, although EPDCCH transmissions start immediately after PDCCH transmissions 510 and are over all remaining subframe symbols, they may instead always start at a fixed location, such as the fourth subframe symbol, and may extend over a part of the remaining subframe symbols. EPDCCH transmissions occur in four PRB pairs, 520, 530, 540, and 550 while the remaining PRB pairs are used for PDSCH transmissions 560, 562, 564, 566, 568.

A UE can be configured by higher layer signaling from a NodeB for one or more sets of PRB pairs that may convey EPDCCHs. The transmission of an EPDCCH to a UE is in one or a few PRB pairs, if a NodeB has accurate CSI for the UE and can perform Frequency Domain Scheduling (FDS) or beam-forming. This transmission is in many PRB pairs, possibly also using transmitter antenna diversity, if accurate CSI per PRB pair is not available at the NodeB. An EPDCCH transmission over one or a few PRB pairs will be referred to as localized or non-interleaved, while an EPDCCH transmission over many PRB pairs will be referred to as distributed or interleaved.

An exact EPDCCH search space design is not material to the present invention and may follow same principles as a PDCCH search space design. An EPDCCH includes respective CCEs, referred to as ECCEs, and a number of EPDCCH candidates exist for each possible ECCE aggregation level $L_E$. For example, $L_E \in \{1,2,4,8\}$ ECCEs exist for localized EPDCCHs and $L_E \in \{1,2,4,8,16\}$ ECCEs exist for distributed EPDCCHs. An ECCE may or may not have the same size as a conventional CCE.

A number of EPDCCH REs per PRB pair varies depending on a size of a conventional DL control region, defined by a number of $M_{symb}^{DL}$ subframe symbols in FIG. 1, on a number of CSI-RS REs and CRS REs, for example. This variation can be addressed either by maintaining a same ECCE size and possibly having a variable number of ECCEs per PRB pair in different subframes (and possibly also having some REs that cannot be allocated to an ECCE) or by maintaining a same number of ECCEs per PRB pair and having a variable ECCE size.

An ECCE size is defined by a respective number of REs available for transmitting an EPDCCH (excluding REs used to transmit other signals in a PRB pair), and is different than a fixed, maximum ECCE size. A maximum ECCE size is obtained by assuming that no signals, other than DMRS associated with demodulation of EPDCCHs, are transmitted in PRB pairs used to transmit EPDCCHs. Then, for a PRB pair including $N_{sc}^{RB}=12$ REs, $N_{symb}^{DL}=14$ subframe symbols, and 24 REs for DMRS transmission, there are $N_{sc}^{RB} \cdot N_{symb}^{DL} - 24 = 144$ REs available for transmitting EPDCCHs, and the maximum ECCE size is 36 REs for 4 ECCEs per PRB pair.

FIG. 6 illustrates conventional variations in an ECCE size per subframe assuming four ECCEs per PRB pair.

Referring to FIG. 6, in a first realization for a number of REs to transmit EPDCCHs 610, a conventional DL control region spans a first three subframe symbols 620 and there is a first number of DMRS REs 630, CSI-RS REs 632, and CRS REs 634. An ECCE size is 21 REs for 4 ECCEs per PRB pair. In a second realization for a number of REs to transmit EPDCCHs 640, a conventional DL control region spans a first one subframe symbol 650, and there is a second number of DMRS REs 660 and CRS REs 662 (no CSI-RS REs). An ECCE size is 30 REs for 4 ECCEs per PRB pair, or about 43% more than in the first realization. Larger variations in an ECCE size may also exist.

As an ECCE size may vary per subframe, and a minimum ECCE aggregation level required to reliably detect an EPDCCH may also vary. A threshold for an ECCE size $T_{RE}$ is defined, and ECCE aggregation levels are twice the aggregation levels for when an ECCE size is greater than or equal to $T_{RE}$, when an ECCE size is less than $T_{RE}$. For example, if $L_E \in \{1,2,4,8\}$ are ECCE aggregation levels for transmitting a distributed EPDCCH with an ECCE size greater than or equal to $T_{RE}$, then $L_E \in \{2,4,8,16\}$ are ECCE aggregation levels for transmitting a distributed EPDCCH with an ECCE size less than $T_{RE}$.

Using a single $T_{RE}$ value fails to properly address a need for a UE to detect different EPDCCHs conveying DCI formats with different information payloads. For example, a first DCI format scheduling a PUSCH may have a payload of 43 bits while a second DCI format scheduling a PDSCH may have a payload of 58 bits. Then, for QPSK and for $T_{RE}=26$, even though an aggregation level of one ECCE may sufficiently convey the first DCI format, as a respective maximum code rate is 0.83, an aggregation level of one ECCE cannot sufficiently convey the second DCI format as a respective maximum code rate is 1.12 and $T_{RE}=35$ would be required for a maximum code rate of about 0.83 for the second DCI format.

Using a single $T_{RE}$ value also fails to account for a variable modulation scheme to transmit an EPDCCH. The modulation scheme is one of the components determining a respective code rate for transmitting an information payload of a DCI format in an EPDCCH for an ECCE aggregation level.

Using a single $T_{RE}$ value further fails to account for variations in an information payload of a DCI format according to a presence or absence of configurable information fields, variations of resource allocation, or other information fields according to a DL or UL operating bandwidth. A UE can determine a DL or UL operating bandwidth by receiving system information transmitted by a NodeB.

Therefore, a need exists in the art to define multiple thresholds of ECCE sizes, each threshold corresponding to one or more DCI formats a UE attempts to detect, for adjusting respective ECCE aggregation levels for EPDCCH candidates depending on whether an ECCE size is less than a threshold or greater than or equal to a threshold.

A need exists in the art to define a threshold of an ECCE size for adjusting respective ECCE aggregation levels for EPDCCH candidates depending on a respective modulation scheme.

A need exists in the art to adjust ECCE aggregation levels for EPDCCH candidates for different DCI formats depending on a maximum bandwidth that can be scheduled, and on the DCI format.

A need exists in the art to adjust ECCE aggregation levels for EPDCCH candidates for different DCI formats depending on a code rate for a respective DCI format.

SUMMARY OF THE INVENTION

Accordingly, the present invention has been designed to solve at least the aforementioned limitations and problems in the prior art, and provides methods and an apparatus for a base station to transmit and for a UE to decode a PDCCH.

In accordance with an aspect of the present invention, a method is provided for a UE to receive control information. A downlink bandwidth and a DCI format to be monitored are identified. An aggregation level is identified based on the identified downlink bandwidth and the identified DCI format. Control information is received based on the identified aggregation level.

In accordance with another aspect of the present invention, a method is provided for a base station to transmit control information. Control information is transmitted. The control information is received by a UE based on an aggregation level. The aggregation level is identified by the UE based on a downlink bandwidth and a DCI format to be monitored.

In accordance with another aspect of the present invention, a UE is provided to receive control information. The UE includes a controller configured to identify a downlink bandwidth and a DCI format to be monitored, and identify an aggregation level based on the identified downlink bandwidth and the identified DCI format. The UE also includes a transceiver configured to receive control information based on the identified aggregation level.

In accordance with another aspect of the present invention, a base station is provided to transmit control information. The base station includes a transceiver configured to transmit control information. The control information is received by a UE based on an aggregation level. The aggregation level is identified by the UE based on a downlink bandwidth and a DCI format to be monitored.

BRIEF DESCRIPTION OF THE DRAWINGS

The above and other aspects, features, and advantages of the present invention will be more apparent from the following detailed description taken in conjunction with the accompanying drawings, in which:

FIG. 10 illustrates a dependence of an ECCE aggregation level for which a UE attempts to detect an EPDCCH conveying a DCI format on an operating bandwidth, according to an embodiment of the present invention;

FIG. 11 illustrates a dependence of EPDCCH candidates per ECCE aggregation level on a DCI format conveyed by an EPDCCH a UE attempts to detect, according to an embodiment of the present invention;

DETAILED DESCRIPTION OF EMBODIMENTS OF THE INVENTION

Embodiments of the present invention will now be described in detail with reference to the accompanying drawings. This present invention may, however, be embodied in many different forms and should not be construed as limited to the embodiments set forth herein. Rather, these embodiments are provided so that this disclosure will fully convey the scope of the present invention to those skilled in the art. Detailed descriptions of well-known functions and structures incorporated herein is omitted for the sake of clarity and conciseness.

Although embodiments of the present invention will be described with reference to Orthogonal Frequency Division Multiplexing (OFDM), they also are generally applicable to all Frequency Division Multiplexing (FDM) transmissions, and particularly applicable to Discrete Fourier Transform (DFT)-spread OFDM.

Figure 6:
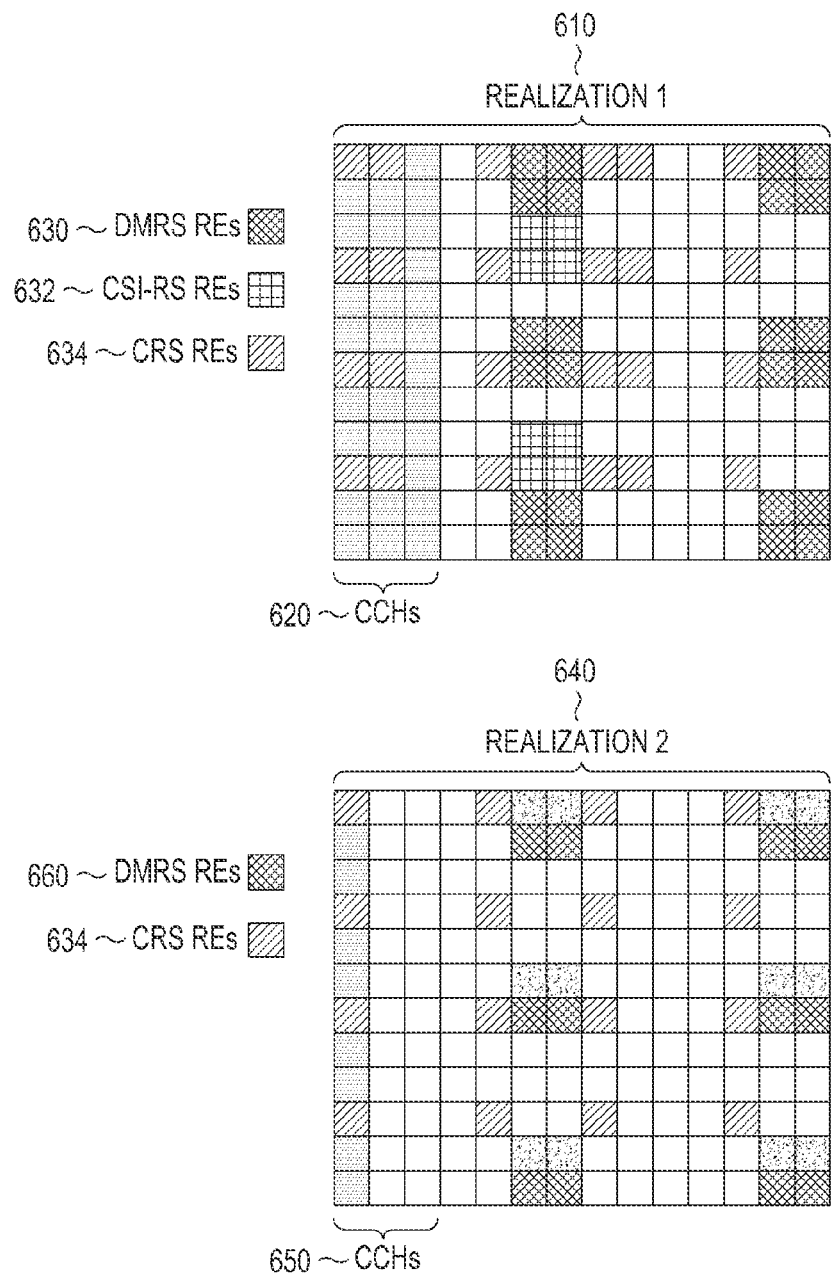
FIG. 6 illustrates variations in an ECCE size per subframe assuming four ECCEs per PRB pair.

The present invention considers methods and an apparatus for adjusting a number of ECCE aggregation levels in a subframe according to an ECCE size, a modulation scheme for an EPDCCH conveying a DCI format, or an operating BW and a DCI format size, and for assigning a different number of EPDCCH candidates per ECCE aggregation level according to a DCI format size. As described in FIG. 6, an ECCE size refers to a number of REs available for transmitting EPDCCHs in a PRB pair assuming a fixed number of ECCEs per PRB pair, such as 4 ECCEs per PRB pair. Therefore, defining multiple thresholds for ECCE sizes is also equivalent to defining multiple thresholds for the number of REs available for transmitting EPDCCHs in a PRB pair (for 4 ECCEs per PRB pair, the latter is a multiple of 4 of the former).

A first embodiment of the present invention considers a definition of multiple thresholds of ECCE sizes, each threshold corresponding to one or more DCI formats a UE attempts to detect, for adjusting respective ECCE aggregation levels in a subframe depending on whether an ECCE size is less than a threshold or greater than or equal to a threshold.

The first embodiment will now be described with respect to a DCI Format 0 scheduling a PUSCH transmission from a UE without spatial multiplexing, a DCI Format 4 scheduling a PUSCH transmission from a UE with or without spatial multiplexing, a DCI Format 1A scheduling a PDSCH transmission to a UE without spatial multiplexing, and a DCI Format 2C scheduling a PDSCH transmission to a UE with or without spatial multiplexing. DCI Format 0 and DCI Format 1A are assumed to be designed so that they have the same size, and they are jointly referred to as DCI Format 0/1A. Due to support of scheduling PUSCH or PDSCH transmissions with spatial multiplexing, DCI Format 4 and DCI Format 2C, respectively, have larger sizes than DCI Format 0/1A. Indicative information payloads for DCI Format 0/1A, DCI Format 4 and DCI Format 2C are 43 bits, 51 bits, and 58 bits, respectively, for a large operating BW of 50 RBs, or 37 bits, 45 bits, and 46 bits, respectively, for a large operating BW of 6 RBs.

Assuming QPSK modulation (conveying two information bits per RE) for an EPDCCH transmission and a target maximum coding rate less than $R_{max}$ to ensure a detection reliability of a respective DCI format, and for a DCI format information payload of $O_{DCI}$ bits, a minimum ECCE size is obtained as $S_{min}=O_{DCI}/(2 \cdot R_{max})$. Denoting by $S_{min}^{0/1A}$ a minimum ECCE size for DCI Format 0/1A and by a minimum ECCE size for DCI Format 2C, a relative difference between the two minimum ECCE sizes is $(S_{min}^{2C} - S_{min}^{0/1A})/S_{min}^{0/1A}$, or about 35% for respective payloads of 43 bits and 58 bits.

Considering that typical variations in an ECCE size due to a presence or absence of other signals are less than 35%, it becomes apparent that using a single $T_{RE}$ value to define ECCE aggregation levels in a subframe for reliable detection for both DCI Format 0/1A and DCI Format 2C will result in either an overestimation of a minimum ECCE aggregation level for the former, or an underestimation of a minimum ECCE aggregation levels for the latter. For example, if an ECCE size threshold of $T_{RE}=26$ REs is used (or, equivalently, a threshold of 4×26=104 available REs for transmitting EPDCCHs in a PRB pair is used), for an EPDCCH transmission with one ECCE, a channel coding rate of 0.83 applies to a DCI Format 0/1A while a channel coding rate of 1.12 applies to a DCI Format 2C. Therefore, reliable detection for DCI Format 0/1A is possible for an EPDCCH transmission with an aggregation level of one ECCE (at least for a UE experiencing a relatively high DL SINR) while reliable detection for DCI Format 2C is not possible for a large operating BW of 50 RBs. For scheduling in a small operating BW of 6 RBs, as the size of DCI Format 2C (46 bits) is similar to that of DCI Format 1A for scheduling in a large operating BW of 50 RBs (43 bits), reliable detection for DCI Format 2C is possible with an EPDCCH transmission having an aggregation level of one ECCE. This also applies for DCI Format 1A as its size (37 bits) is less than the size for scheduling in a large operating BW of 50 RBs (43 bits).

Reliable detection for both DCI Format 0/1A and DCI Format 2C is achieved if $T_{RE}$ was increased, for example to a value of 36. However, this may substantially reduce a use for an aggregation level of one ECCE as, for four ECCEs per PRB pair, a number of available REs per PRB pair is rarely equal to 144 (for example, due to presence of other signals such as CRS or CSI-RS or conventional control signals). An increase $T_{RE}$ value may also often require unnecessary coding redundancies (low channel coding rates) for a transmission of DCI formats with relatively low information payloads, such as DCI Format 0/1A. Nevertheless, an additional threshold for an ECCE size can be introduced to accommodate one or more of second DCI formats a UE is configured to detect.

An immediate implication of the above inability to efficiently support both DCI Format 0/1A and DCI Format 2C with an aggregation level of one ECCE, is that different DCI formats should be allocated a different number of ECCE aggregation levels in a subframe. For example, as previously described, for DCI Format 0/1A an aggregation level of one ECCE is supported for all operating BWs while for DCI Format 2C an aggregation level of one ECCE is not supported for large operating BWs.

Figure 7:
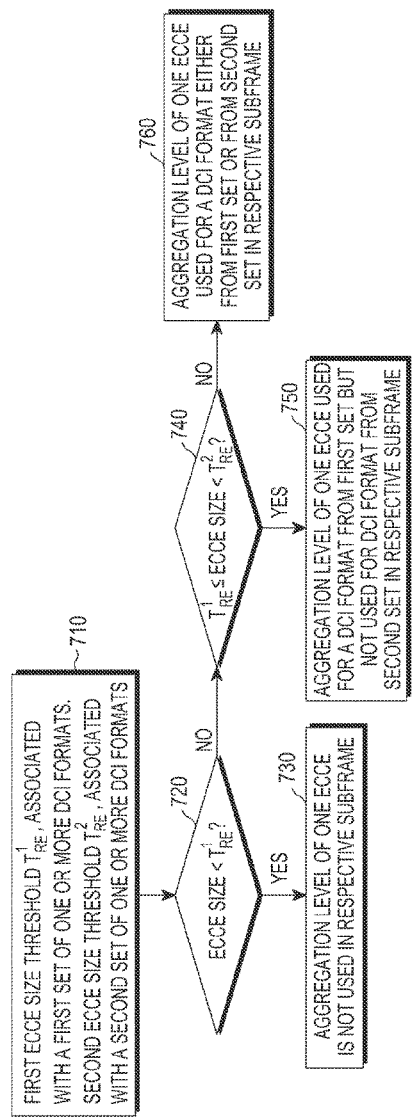
FIG. 7 illustrates a use of multiple thresholds for an ECCE size, where each threshold is associated with one or more DCI formats a UE attempts to detect in a subframe, for adjusting a number of ECCE aggregation levels, according to an embodiment of the present invention.

FIG. 7 illustrates a use of multiple thresholds for an ECCE size, where each threshold is associated with one or more DCI formats a UE attempts to detect in a subframe, for adjusting a number of ECCE aggregation levels, according to an embodiment of the present invention.

Referring to FIG. 7, at least a first ECCE size threshold $T_{RE}^1$, associated with a first set of one or more DCI formats, such as DCI Format 0/1A, and a second ECCE size threshold $T_{RE}^2$, associated with a second set of one or more DCI formats, such as DCI Format 2C, are used for ECCE aggregation levels in a subframe in step 710. The values of $T_{RE}^1$ and $T_{RE}^2$ is specified in an operation of a communication system or is configured to a UE from a NodeB by higher layer signaling. Assuming that $T_{RE}^2 > T_{RE}^1$, if an ECCE size in a subframe is less than $T_{RE}^1$ in step 720, an aggregation level of one ECCE may not be used to transmit an EPDCCH for any DCI format in step 730. If additionally an ECCE size is less than $T_{RE}^2/2$, an aggregation level of two ECCEs may not be used for an EPDCCH transmission conveying a DCI format from the second set. Nevertheless, for simplicity, it is assumed that $T_{RE}^2 < 2 \cdot T_{RE}^1$ and that a smallest ECCE size is greater than $T_{RE}^1/2$ (and hence greater than $T_{RE}^2/4$). If an ECCE size in a subframe is greater than or equal to $T_{RE}^1$ but less than $T_{RE}^2$ in step 740, an aggregation level of one ECCE is used for an EPDCCH transmission to convey a DCI format from the first set but may not be used for an EPDCCH transmission to convey a DCI format from the second set in step 750. If an ECCE size in a subframe is greater than or equal to $T_{RE}^2$, an aggregation level of one ECCE is used for an EPDCCH transmission to convey a DCI format either from the first set of DCI formats or from the second set of DCI formats in step 760.

When an ECCE size is less than $T_{RE}^1$ or $T_{RE}^2$, an inability to use an aggregation level of one ECCE to transmit an EPDCCH conveying a respective DCI format additionally requires that a maximum ECCE aggregation level is doubled. For example, if a nominal set of ECCE aggregation levels is defined as $L_E \in \{1,2,4,8\}$ ECCEs then, when an aggregation level of one ECCE is not supported for a DCI format in a subframe, a supplemental set of ECCE aggregation levels is defined as $L_E \in \{2,4,8,16\}$. Whether a UE considers a nominal set of ECCE aggregation levels which includes an aggregation level of one ECCE and has a first maximum aggregation level or considers a supplemental set of ECCE aggregation levels which does not include an aggregation level of one ECCE and has a second maximum aggregation level, wherein the second maximum is twice the first maximum, depends on whether an ECCE size in a respective subframe is smaller than or greater than or equal to a threshold corresponding to a respective DCI format.

Figure 8A:
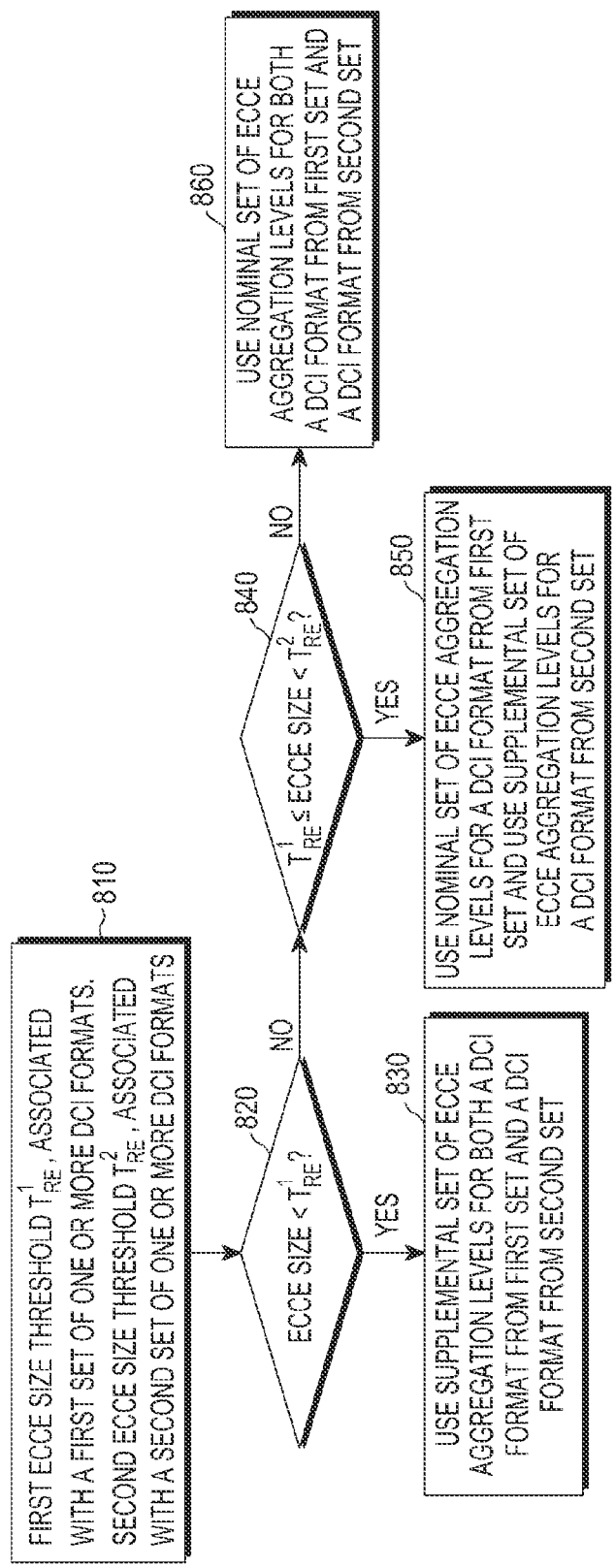
FIG. 8A illustrates a use of a nominal set of ECCE aggregation levels or a use of a supplemental set of ECCE aggregation levels depending on a DCI format among multiple DCI formats, according to an embodiment of the present invention.

FIG. 8A illustrates a use of a nominal set of ECCE aggregation levels or a use of a supplemental set of ECCE aggregation levels depending on a DCI format among multiple DCI formats, according to an embodiment of the present invention.

Referring to FIG. 8A, at least a first ECCE size threshold $T_{RE}^1$, associated with a first set of one or more DCI formats, such as DCI Format 0/1A, and a second ECCE size threshold $T_{RE}^2$, associated with a second set of one or more DCI formats, such as DCI Format 2C, are re-used for ECCE aggregation levels in a subframe in step 810. If an ECCE size in a subframe is less than $T_{RE}^1$ in step 820, a supplemental set of ECCE aggregation levels is used for a transmission of both a DCI format from a first set of DCI formats and of a DCI format from a second set of DCI formats in respective EPDCCHs in step 830. If an ECCE size in a subframe is greater than or equal to $T_{RE}^1$ but less than $T_{RE}^2$ in step 840, a nominal set of ECCE aggregation levels is used for a transmission of a DCI format from a first set of DCI formats and a supplemental set of ECCE aggregation levels is used for a transmission of a DCI format from a second set of DCI formats in respective EPDCCHs in step 850. If an ECCE size in a subframe is greater than or equal to $T_{RE}^2$, a nominal set of ECCE aggregation levels is used for a transmission of both a DCI format from a first set of DCI formats and of a DCI format from a second set of DCI formats in respective EPDCCHs in step 860.

A UE may only decode EPDCCH candidates for ECCE aggregation levels used for an EPDCCH transmission. Additionally, ECCE aggregation levels when one ECCE can be used for an EPDCCH transmission conveying a DCI format are $L_E \in \{1,2,4,8\}$ ECCEs. When one CCE cannot be used for an EPDCCH transmission conveying a same DCI format, ECCE aggregation levels are $L_E \in \{2,4,8,16\}$ ECCEs.

An ECCE size threshold, or equivalently a threshold for a number of REs in a PRB pair for EPDCCH transmissions, may also depend on a subframe. A reason for such dependence is that a UE may not be aware of all REs in a PRB pair that may not be available for transmitting EPDCCHs. For example, a configuration of CSI-RS in a subframe is UE-specific and a UE may not be aware of REs associated with CSI-RS in a subframe to other UEs. Then, as a NodeB may not transmit EPDCCH in REs associated with CSI-RS, a UE that is unaware of REs associated with CSI-RS will treat such REs as conveying EPDCCH thereby assuming an ECCE size greater than an actual one (in addition to experiencing a degradation in a detection reliability of an EPDCCH as REs associated with CSI-RS are treated as conveying EPDCCH).

To circumvent the above problem, a NodeB may either configure by higher layer signaling all CSI-RS instances to a UE, while differentiating among the ones intended and the ones not intended to a UE, or configure per subframe, in a set of subframes, an ECCE size threshold. The set of subframes includes a number of subframes, such as 10 subframes, and can repeat every such number of subframes until re-configured. In the latter case, a NodeB may configure a larger ECCE size threshold in subframes with transmissions of signals a UE is unaware of than in subframes with transmissions of signals that are fully known to a UE. For example, two ECCE sizes can be defined and a NodeB can indicate (for example, with a binary '0') the subframes for which the first ECCE size applies and can indicate (for example, with a binary '1') the subframes for which the second ECCE size applied. A NodeB may also configure a UE with different EPDCCH candidates per ECCE aggregation level per subframe so that in subframes with REs associated with signals a UE is unaware of, more EPDCCH candidates are allocated to higher ECCE aggregation levels.

In addition to an ECCE size threshold depending on a subframe, a set of PRB pairs used to transmit EPDCCH may also depend on a subframe in order to account for variations in a number of REs available for transmitting EPDCCHs per subframe. In principle, to accommodate a same minimum requirement in REs for transmitting EPDCCHs in a subframe, if an ECCE size (or a number of REs per PRB pair available for transmitting EPDCCHs per subframe to a UE) decreases by a factor of X, a respective number of PRB pairs should increase by a factor of 1/X. Therefore, if a first minimum number of PRB pairs is used in a first subframe for transmitting EPDCCHs when an ECCE size has a first value, a second minimum number of PRB pairs is used in a second subframe for transmitting EPDCCHs when an ECCE size has a second value. For example, a minimum of 4 PRB pairs is used to transmit EPDCCHs in a subframe having an ECCE size greater than or equal to 26 REs and a minimum of 8 PRB pairs is used to transmit EPDCCHs in a subframe having an ECCE size less than 26 REs. The minimum number of PRB pairs used to transmit EPDCCHs in a subframe is implicitly derived from a number of REs per PRB pair available for transmitting EPDCCHs per subframe or from an ECCE size (or from an ECCE size threshold), with a reference value being configured or specified in a system operation for a DL BW, or it is separately configured to a UE per subframe.

Figure 8B:
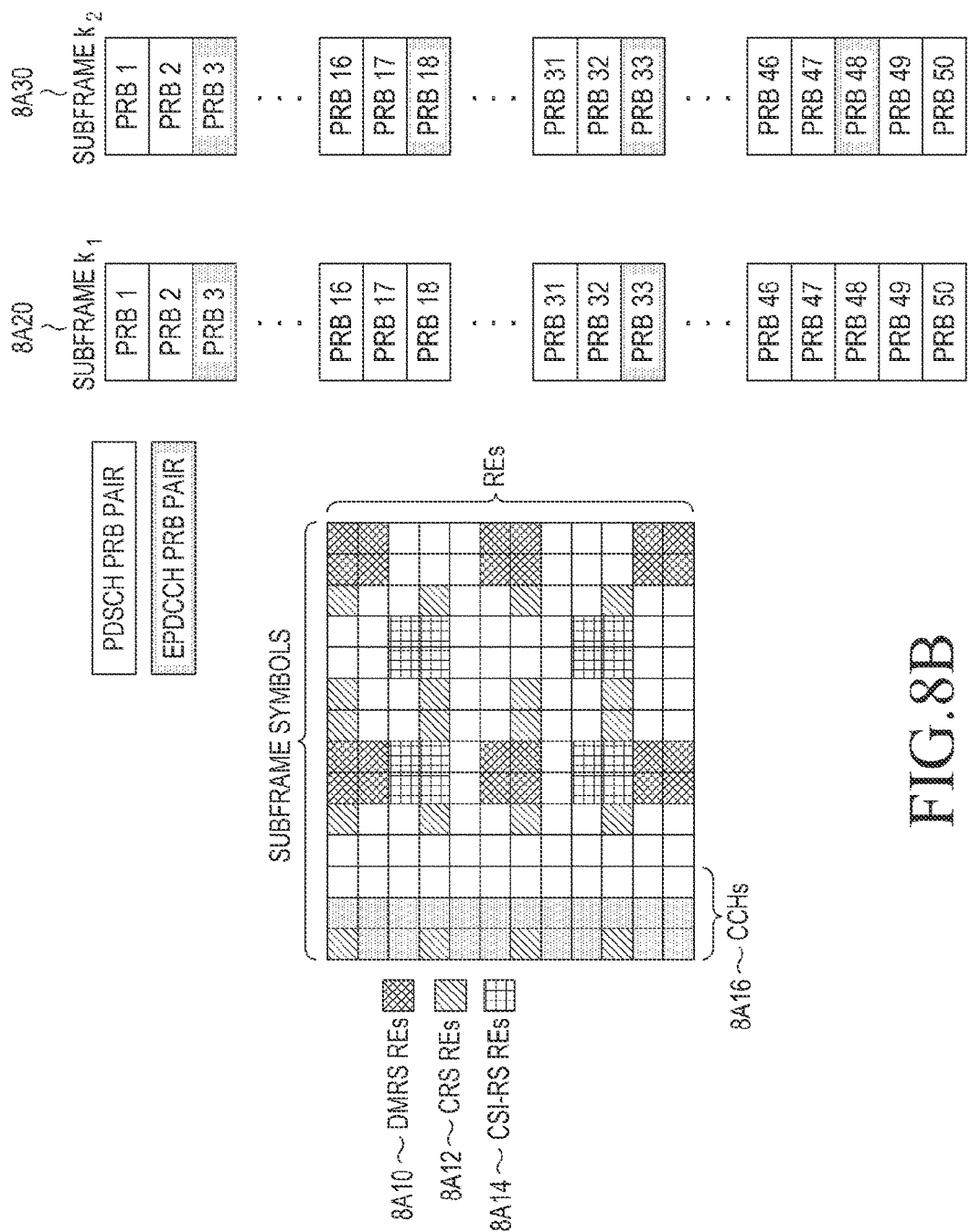
FIG. 8B illustrates a configuration of an ECCE threshold value per subframe and a configuration of a minimum set of PRB pairs for transmitting EPDCCHs per subframe, according to an embodiment of the present invention.

FIG. 8B illustrates a configuration of an ECCE threshold value per subframe and a configuration of a minimum set of PRB pairs for transmitting EPDCCHs per subframe, according to an embodiment of the present invention.

Referring to FIG. 8B, a PRB pair used to transmit EPDCCHs contains DMRS REs 8A10, CRS REs 8A12, and REs for CCHs 8A16. A UE is assumed to be fully aware of all such REs. The PRB pair also contains CSI-RS REs 8A14 that the UE is not aware of (in general, a UE may not be aware of a first number of CSI-RS REs and be aware of a second number of CSI-RS REs in a PRB pair). As a consequence of not being aware of all CSI-RS REs, a UE may assume an ECCE size of 30 REs when an actual ECCE size (for UEs fully aware of CSI-RS REs) is 26 REs. To avoid this problem, instead of a UE computing on its own an ECCE threshold value, it is configured by a NodeB an ECCE threshold value which in the example of FIG. 8B may inform of the actual ECCE size or even of a less than the actual ECCE size in order to account for a degradation in an EPDCCH detection reliability. To account for a variable ECCE size per subframe, whether it is one computed by a UE or one configured to a UE by higher layer signaling from a NodeB, a minimum number of PRB pairs used to transmit EPDCCHs may also vary per subframe. For example, for a DL BW of 50 PRB pairs, in subframe $k_1$, a minimum of two PRB pairs (PRB pair 3 and PRB pair 33) are used to transmit EPDCCHs while in subframe $k_2$ (with an ECCE size less than in subframe $k_1$), a minimum of four PRB pairs (PRB pair 3, PRB pair 18, PRB pair 33, and PRB pair 48) are used to transmit EPDCCHs. A same condition occurs when an EPDCCH transmission is over a small number of transmission symbols per subframe as a number of respective REs per PRB pair is also small.

The second embodiment of the present invention considers a dependence of ECCE aggregation levels to an order $Q_m$ of a modulation scheme used for an EPDCCH transmission.

A modulation order $Q_m$ is a measure of a spectral efficiency. QPSK conveys two information bits per RE ($Q_m=2$) while Quadrature Amplitude Modulation with 16 states (QAM16) conveys four information bits per RE ($Q_m=4$). A modulation order is configured to a UE by higher layer signaling from a NodeB. A modulation order is the same for all DCI formats a UE attempts to detect in a UE-DSS in a subframe or depend on a DCI format such as using $Q_m=2$ for DCI Format 0/1A and using $Q_m=4$ for DCI Format 2C.

Applying a same analysis to determine a minimum ECCE size as for the first embodiment of the invention while considering a modulation order of an EPDCCH transmission, a minimum ECCE size is obtained as $S_{min}=O_{DCI}/(Q_m \cdot R_{max})$. Considering for simplicity only a single ECCE size threshold $T_{RE}$ and that a smallest ECCE size is greater than $T_{RE}/2$, an ECCE aggregation level for which a UE may attempt to detect an EPDCCH for a respective DCI format in a subframe may depend on a modulation order of an EPDCCH transmission in addition to $T_{RE}$. Therefore, if an ECCE size in a respective subframe is less than $T_{RE}$, a UE may not attempt detection of a DCI format for an aggregation level of one ECCE if a respective EPDCCH is transmitted using QPSK modulation while it may attempt such detection if a respective EPDCCH is transmitted using QAM16 modulation.

Figure 9:
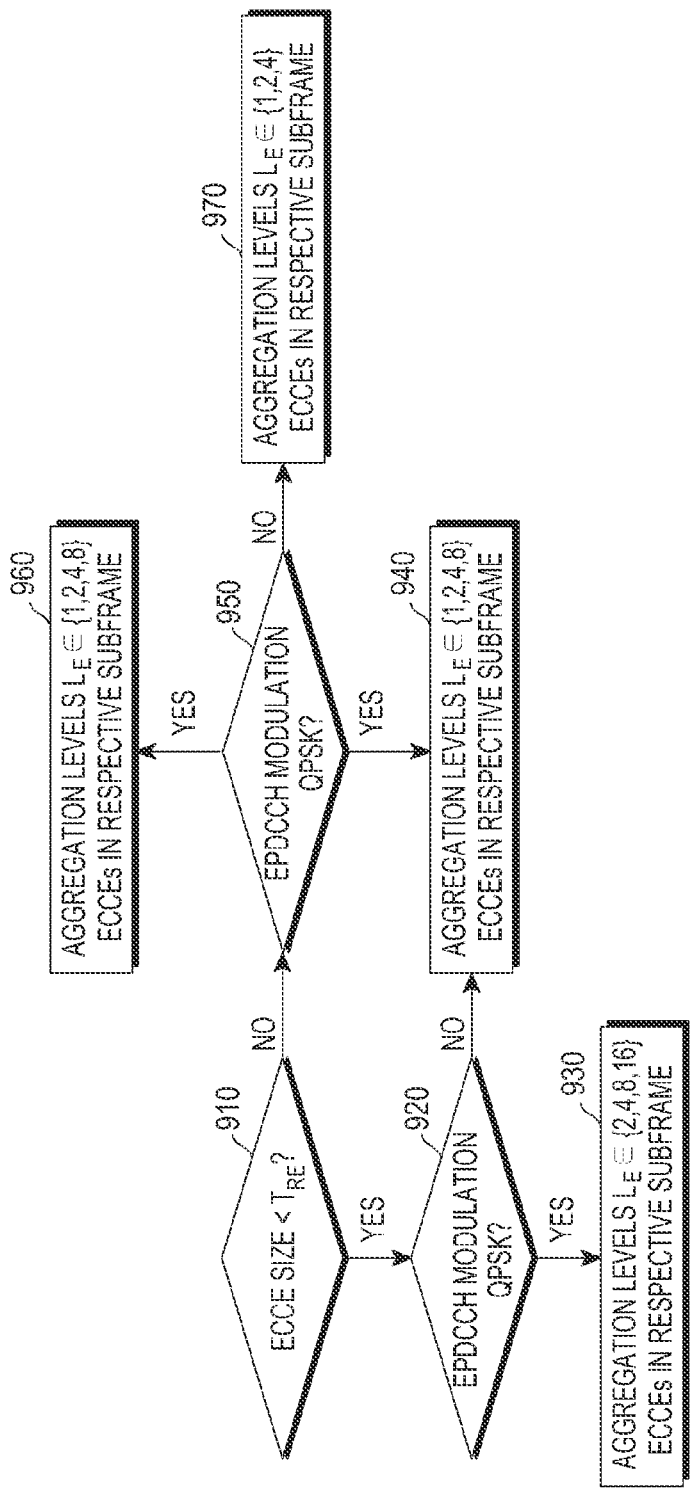
FIG. 9 illustrates a dependence of an ECCE aggregation level on an EPDCCH modulation scheme, according to an embodiment of the present invention.

FIG. 9 illustrates a dependence of an ECCE aggregation level on an EPDCCH modulation scheme, according to an embodiment of the present invention.

Referring to FIG. 9, either QPSK or QAM16 is assumed as a modulation scheme for an EPDCCH transmission. If an ECCE size in a respective subframe is less than $T_{RE}$ in step 910, and an EPDCCH transmission uses QPSK modulation in step 920, respective ECCE aggregation levels are $L_E \in \{2,4,8,16\}$ ECCEs in step 930. If an EPDCCH transmission uses QAM16 modulation in step 920, respective ECCE aggregation levels are $L_E \in \{1,2,4,8\}$ ECCEs in step 950. If an ECCE size in a respective subframe is greater than or equal to $T_{RE}$ in step 910, and an EPDCCH transmission uses QPSK modulation in step 940, respective ECCE aggregation levels are $L_E \in \{1,2,4,8\}$ ECCEs in step 950 and step 960. If an EPDCCH transmission uses QAM16 modulation, respective ECCE aggregation levels are $L_E$ E ECCEs in step 970.

A use of QAM16 modulation applies only for a transmission of a DCI format in a UE-DSS while QPSK modulation applies for a transmission of the same DCI format in a CSS. For example, when a DCI Format 0/1A is transmitted through an EPDCCH in a UE-DSS, QAM16 modulation is configured to a UE for an EPDCCH transmission. Conversely, when a DCI Format 0/1A is transmitted through an EPDCCH in a CSS, QPSK modulation is always used. Relying on QPSK modulation to transmit a DCI format in a CSS and configuring QAM16 modulation only for transmitting a DCI format in a UE-DSS allows, for example, fallback support for UE scheduling when a channel experienced by a UE deteriorates enough for support of QAM16 to be unreliable in practice. Additionally, QPSK modulation for an EPDCCH transmission in a CSS can be used to support UE scheduling during an uncertainty period over which a NodeB cannot know whether a UE applied a latest configuration of a modulation scheme (when switching between QPSK and QAM16) associated with an EPDCCH transmission.

The third embodiment of the present invention considers a dependence of ECCE aggregation levels according to a presence or absence of configurable information fields, variations of a resource allocation information field or of other information fields, or an operating bandwidth.

A DCI format may contain information fields that are configurable by higher layer signaling from a NodeB and, as a consequence, a DCI format size may vary depending on the presence or absence of such information fields. For example, a DCI format is configured based on a presence or absence of a field consisting of one or two bits and triggering a transmission of a reference signal by a UE for channel sounding purposes, or of a field consisting of three bits and indicating a carrier for which a respective DCI format is intended in a multi-carrier communication system.

An additional source of variations for a DCI format size is a maximum BW that needs to be addressed by a respective DCI format for scheduling a PDSCH transmission to a UE or a PUSCH transmission from a UE. The source of this variation is a size of a Resource Allocation (RA) field in DCI formats. This RA field indicates a number of PRB pairs (or another resource unit such as a number of PRB pair groups), and depends on a respective total number of RBs in an operating BW. For example, for an operating BW of 5 MHz, a RA field in a DCI Format 2C may include 13 bits while for an operating BW of 20 MHz, a RA field in a DCI Format 2C may include 25 bits. Thus, for DCI Format 2C, although a code rate below a value required for reliable detection can be achieved for a respective PDCCH transmission over one ECCE when a respective PDSCH is scheduled in a small operating BW, such a code rate cannot be achieved with transmission over one ECCE when a respective PDSCH is scheduled in a large operating BW. However, for DCI Format 1A a code rate below a value required for reliable detection can be achieved for a respective PDCCH transmission over one ECCE, regardless of the operating BW.

At least an operating BW is considered to accommodate variations in a DCI format size when determining a threshold for an ECCE size for defining ECCE aggregation levels for an EPDCCH transmission in a subframe. Different thresholds for an ECCE size for different BWs may also be defined, either by fixed values in an operation of a communication system or by configuration to each UE through higher layer signaling from a NodeB.

FIG. 10 illustrates a dependence of an ECCE aggregation level for which a UE attempts to detect an EPDCCH conveying a DCI format on an operating bandwidth, according to an embodiment of the present invention.

Referring to FIG. 10, when a PDSCH transmission to a UE or a PUSCH transmission from a UE is scheduled by a respective DCI format within a respective DL BW or UL BW that includes a first total number of PRB pairs in step 1010, a first threshold $T_{RE,1}$ is used for an ECCE size in order to determine ECCE aggregation levels in a respective subframe in step 1020. Therefore, a first set of ECCE aggregation levels is used. Conversely, when a PDSCH transmission to a UE or a PUSCH transmission from a UE is scheduled by a respective DCI format within a respective DL BW or UL BW that includes a second total number of PRB pairs in step 1030, a second threshold $T_{RE,2}$ is used for an ECCE size in order to determine ECCE aggregation levels in a respective subframe in step 1040. Therefore, a second set of ECCE aggregation levels is used. For example, if for the first maximum number of RBs in an operating BW an ECCE size is less than $T_{RE,1}$ so that a resulting code rate cannot support reliable EPDCCH detection for a DCI format, ECCE aggregation levels for a respective EPDCCH transmission conveying the DCI format in a respective subframe is $L_E \in \{2,4,8,16\}$ ECCEs. Otherwise, ECCE aggregation levels for a respective EPDCCH transmission conveying the DCI format in a respective subframe is $L_E \in \{1,2,4,8\}$ ECCEs.

The fourth embodiment of the present invention considers an assignment of a different number of EPDCCH candidates for different DCI formats for a same set of ECCE aggregation levels, according to a respective size of one or more DCI formats a UE is configured to decode by a NodeB.

A different number of EPDCCH candidates is assigned for different DCI formats for a same set of ECCE aggregation levels since a code rate for a respective EPDCCH transmission depends on a respective DCI format payload. For example, for an operating BW of 50 RBs, for QPSK modulation ($Q_m=2$) of an EPDCCH and for an aggregation level of two ECCEs with an ECCE size of S=30 REs, a code rate for conveying a DCI Format 0/1A with an information payload of $O_{DCI}=43$ bits in a respective EPDCCH is $R=O_{DCI}/(S \cdot Q_m)=0.716$ (can provide reliable EPDCCH detection), while a code rate for conveying a DCI Format 2C with an information payload of $O_{DCI}=58$ bits in a respective EPDCCH using is R=0.966 (cannot provide reliable EPDCCH detection). Therefore, the likelihood for an EPDCCH transmission with an aggregation level of 2 ECCEs for the same UE and DCI format detection reliability, varies depending on whether DCI Format 0/1A or DCI Format 2C is conveyed due to a variation in a respective code rate. Depending on their construction method, the ECCEs in a set of PRB pairs can vary in size (typically only by a few REs). When they vary in size, the smallest ECCE is considered in the determination of the code rate, in order to maintain a simple and robust operation.

To improve utilization for a fixed number of EPDCCH candidates a UE attempts to decode in a subframe for a respective number of ECCE aggregation levels, a distribution for such candidates to respective ECCE aggregation levels should be adjusted for each respective DCI format in order to address a respective difference in a resulting code rate. For example, to enable reliable detection of DCI Format 2C conveyed by an EPDCCH, a minimum of 2 ECCEs is always required for scheduling in a large DL BW, while one ECCE is sufficient when scheduling in a small DL BW. For DCI Format 1A, having a smaller size than DCI Format 2C, a code rate for a respective EPDCCH transmission over one ECCE is sufficient in all operating DL BWs. A number of EPDCCH candidates per ECCE aggregation level for a DCI format is either defined in an operation of a communication system or configured to a UE by higher layer signaling from a NodeB.

FIG. 11 illustrates a dependence of EPDCCH candidates per ECCE aggregation level on a DCI format conveyed by an EPDCCH a UE attempts to detect, according to an embodiment of the present invention.

Referring to FIG. 11, when a UE decodes EPDCCHs for detecting a first DCI format in step 1110, it considers a first set of EPDCCH candidates for each respective ECCE aggregation level defined in a respective subframe in step 1120. When a UE decodes EPDCCHs for detecting a second DCI format in step 1130, it considers a second set of EPDCCH candidates for each respective ECCE aggregation level defined in a respective subframe in step 1140. For example, for aggregation levels $L_E \in \{1,2,4,8\}$ ECCEs in a subframe, a number of respective EPDCCH candidates is {6,6,2,2} for DCI Format 0/1A and is {0,8,6,2} for DCI Format 2C.

Figure 1:
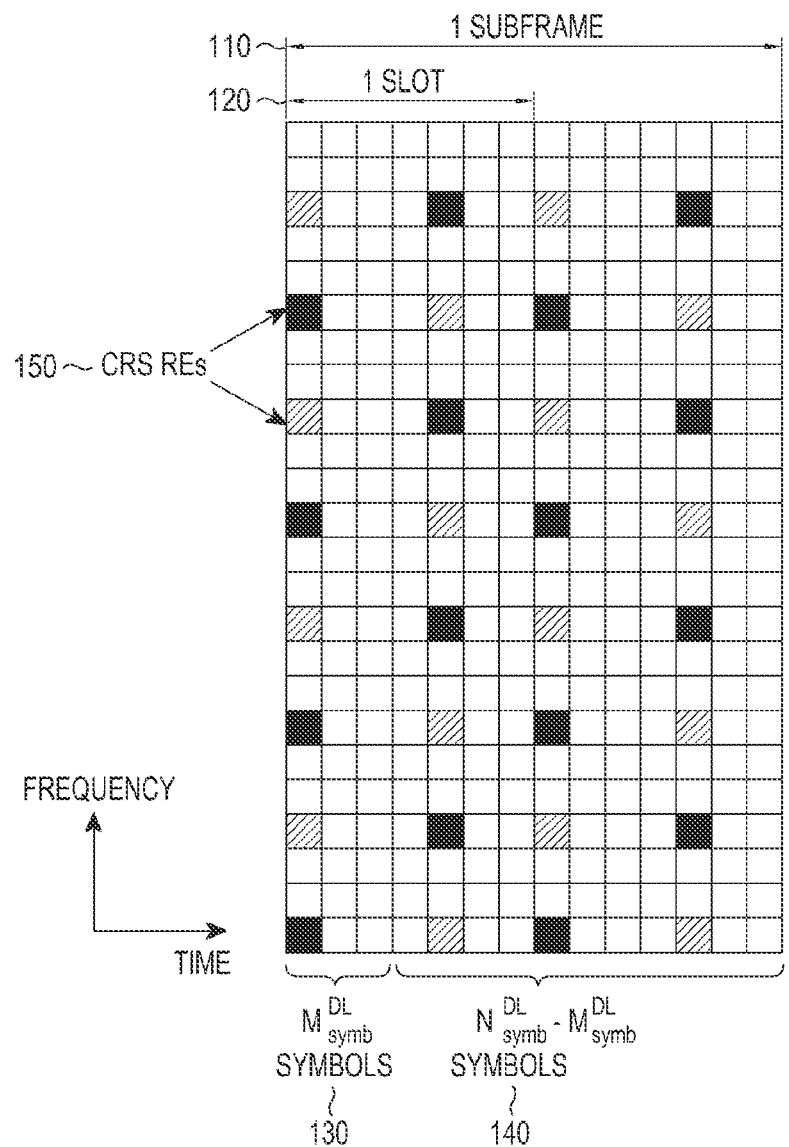
FIG. 1 illustrates a structure for a DL TTI.
Figure 2:
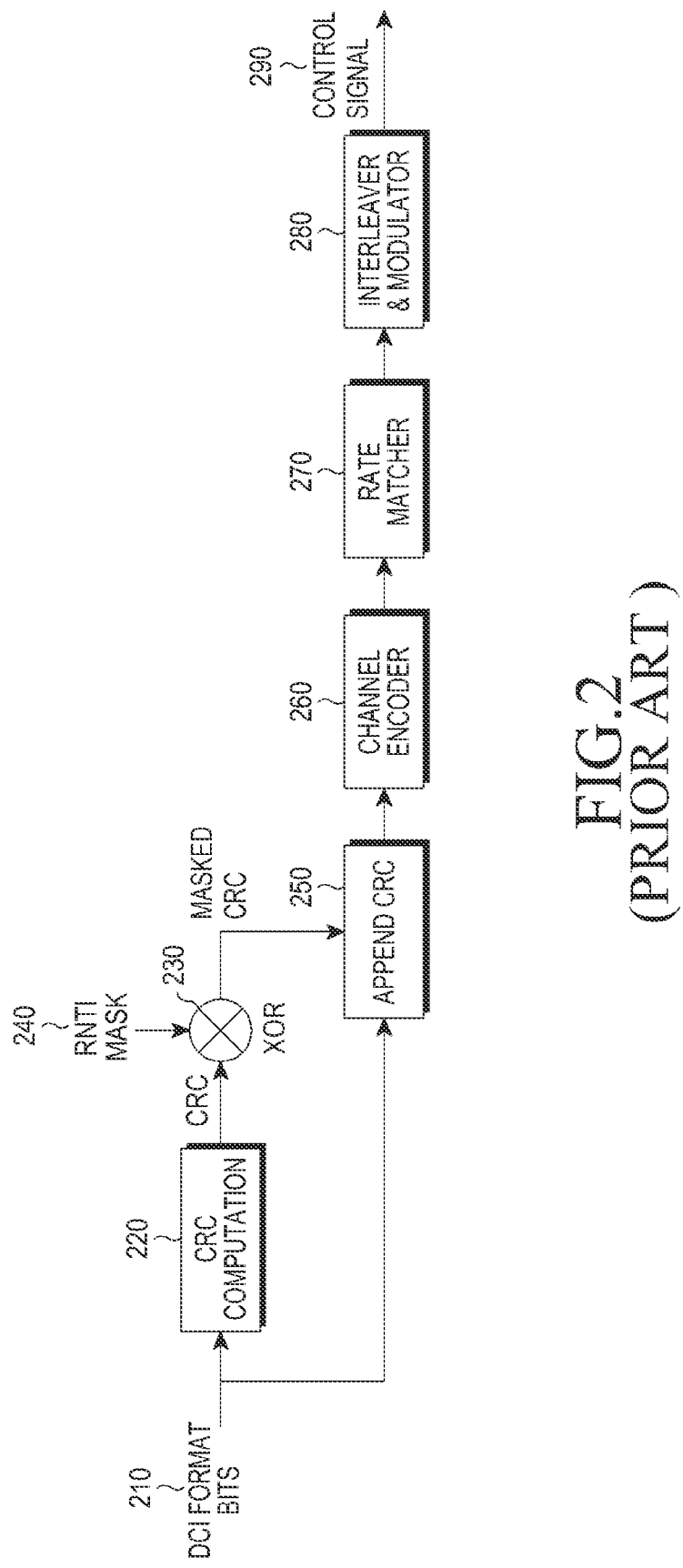
FIG. 2 illustrates an encoding process for a DCI format.

A NodeB transmitter implementing the embodiments of the present invention follows the conventional structure in FIG. 2, with an additional functionality of adjusting a channel coding according to ECCE aggregation levels used in a subframe.

Figure 12:
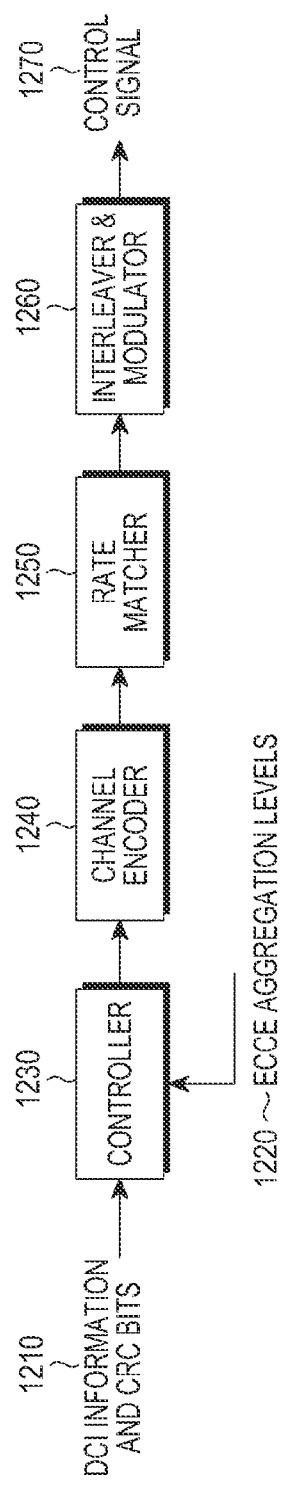
FIG. 12 illustrates an encoding and transmission process for a DCI format at a NodeB transmitter incorporating an adaptation of ECCE aggregation levels per subframe, according to an embodiment of the present invention.

FIG. 12 illustrates an encoding and transmission process for a DCI format at a NodeB transmitter incorporating an adaptation of ECCE aggregation levels per subframe, according to an embodiment of the present invention.

Referring to FIG. 12, based on an input of a total payload for DCI information and CRC bits 1210 (as described in FIG. 2) and on an input of ECCE aggregation levels for an EPDCCH transmission in a subframe 1220, a controller 1230 determines coding rates and rate matching parameters to apply for an EPDCCH transmission. For example, if a set of ECCE aggregation levels $L_E \in \{1,2,4,8\}$ ECCEs is used in a subframe, a convolutional encoder applies a code rate of 2/3 for an aggregation level of one ECCE, a code rate of 1/3 for an aggregation level of two ECCEs, a code rate of 1/3 and one repetition for an aggregation level of four ECCEs, or a code rate of 1/3 and two repetitions for an aggregation level of eight ECCEs. Conversely, if a set of ECCE aggregation levels $L_E \in \{2,4,8,16\}$ ECCEs is used in a subframe, a convolutional encoder applies a code rate of 1/3 without any repetition for an aggregation level of two ECCEs, with one repetition for an aggregation level of four ECCEs, two repetitions for an aggregation level of eight ECCEs, and eight repetitions for an aggregation level of sixteen ECCEs. Subsequently, a channel encoder 1240 applies a selected code rate with a selected number of repetitions, a rate matcher 1250 maps encoded bits of a DCI format to allocated resources, the bits are interleaved and modulated by an interleaver and a modulator 1260, and a control signal 1270 is transmitted.

Figure 3:
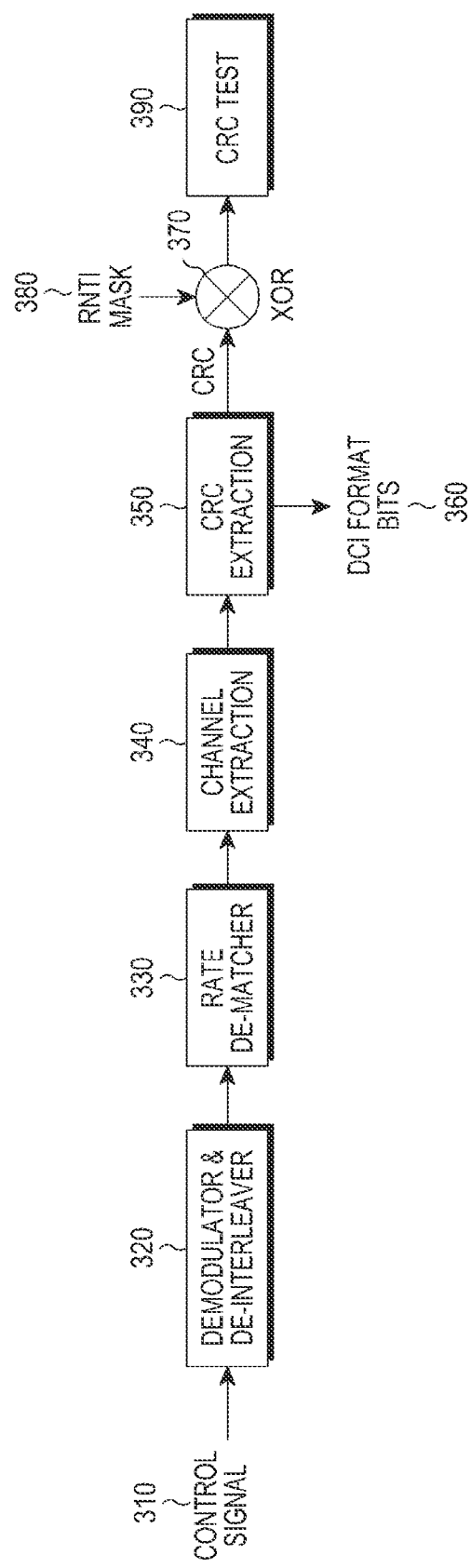
FIG. 3 illustrates a decoding process for a DCI format.
Figure 4:
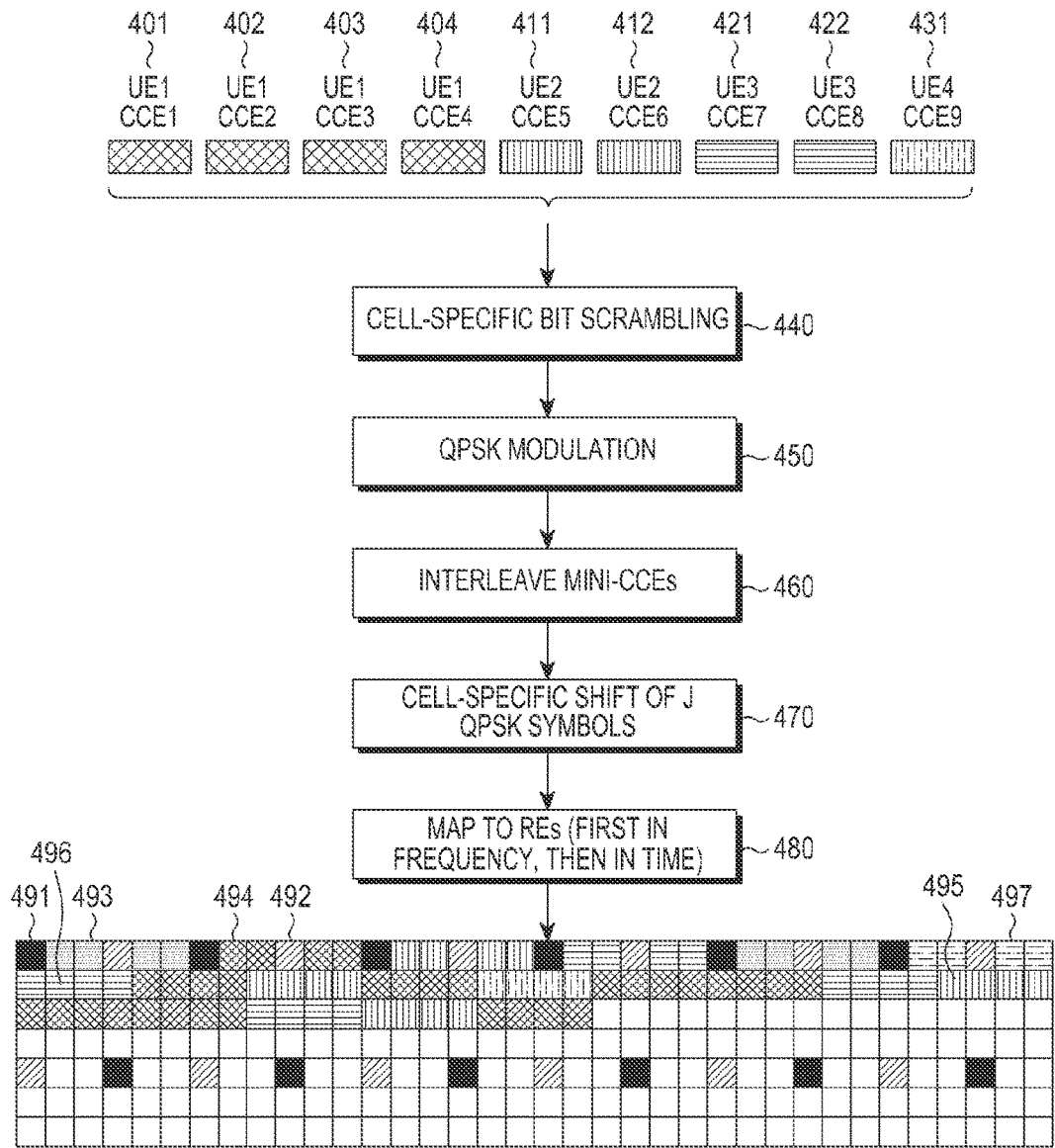
FIG. 4 illustrates a transmission process of DCI formats in respective PDCCHs.
Figure 5:
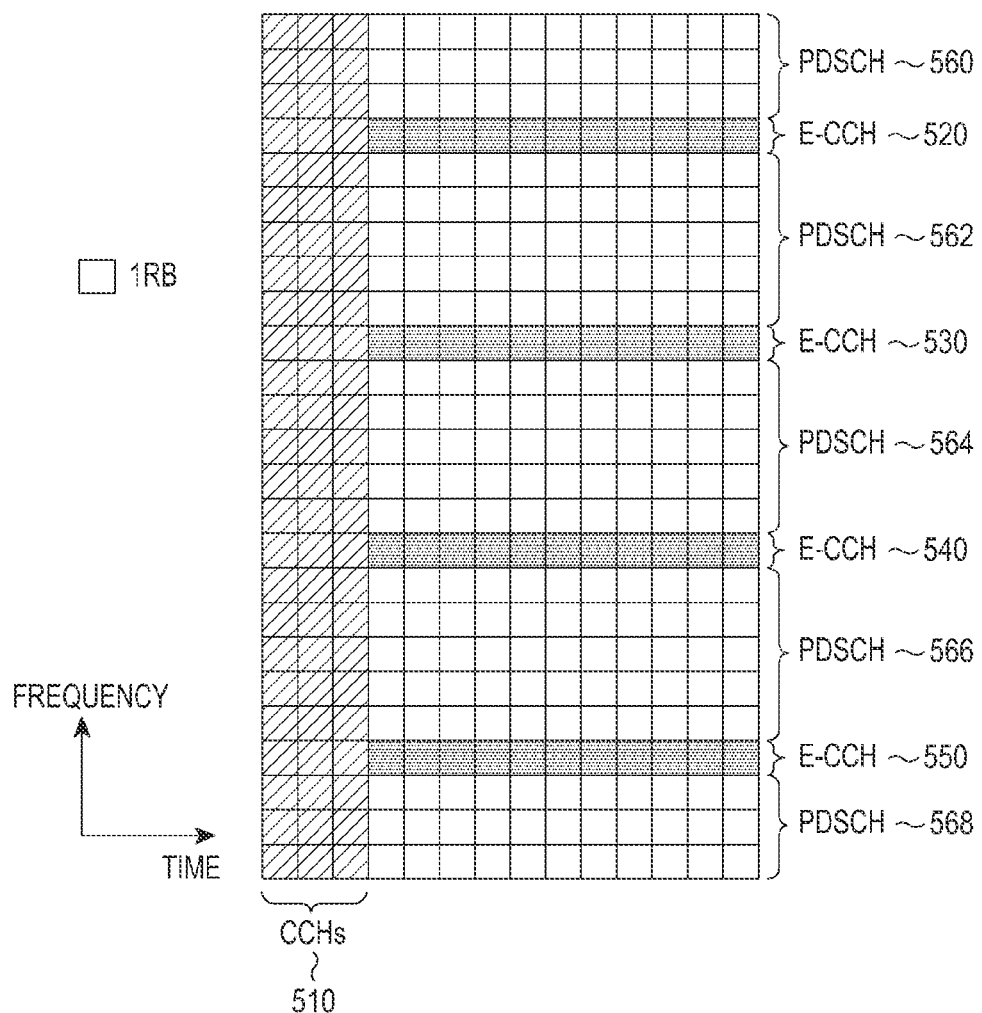
FIG. 5 illustrates an EPDCCH transmission structure in a DL TTI.

A UE receiver implementing the embodiments of the present invention follows the conventional structure in FIG. 3 with an additional functionality of adjusting a channel decoding according to ECCE aggregation levels used in a subframe.

Figure 13:
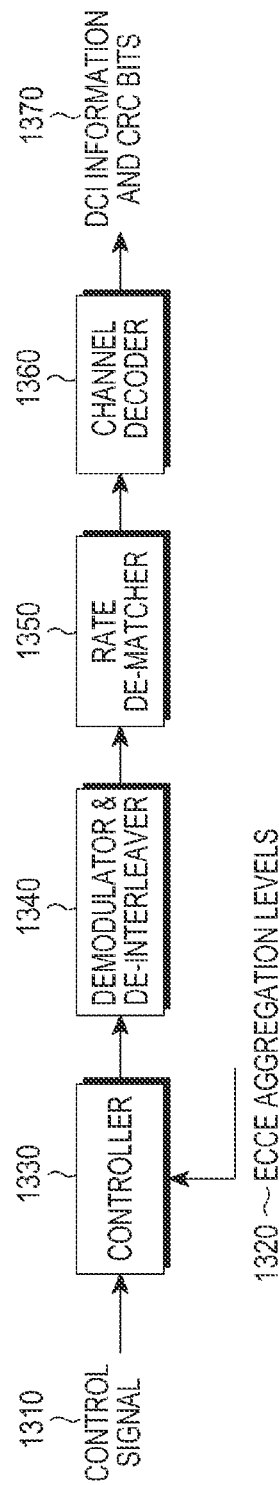
FIG. 13 illustrates a reception and decoding process for a DCI format at a UE receiver incorporating an adaptation of ECCE aggregation levels per subframe, according to an embodiment of the present invention.

FIG. 13 illustrates a reception and decoding process for a DCI format at a UE receiver incorporating an adaptation of ECCE aggregation levels per subframe, according to an embodiment of the present invention.

Referring to FIG. 13, a UE receives a control signal 1220 and, based on an input of ECCE aggregation levels for an EPDCCH transmission in a subframe 1320 (as determined by a respective ECCE size and a payload of a respective DCI format, or a modulation scheme, or a scheduling BW), a controller 1330 determines respective demodulation and de-interleaving parameters 1340, rate de-matching parameters 1350, and channel decoding parameters 1360. Decoded DCI information and CRC bits 1370 are then considered for further processing as described in FIG. 3. For example, if a set of ECCE aggregation levels $L_E \in \{1,2,4,8\}$ ECCEs is used in a subframe, a convolutional decoder may use a code rate of 2/3 for an aggregation level of one ECCE, a code rate of 1/3 for an aggregation level of two ECCEs, a code rate of 1/3 with one repetition for an aggregation level of four ECCEs, or a code rate of 1/3 and two repetitions for an aggregation level of eight ECCEs. Conversely, if a set of ECCE aggregation levels $L_E \in \{2,4,8,16\}$ ECCEs is used in a subframe, a convolutional decoder may use a code rate of 1/3 without any repetition for an aggregation level of two ECCEs, with one repetition for an aggregation level of four ECCEs, with two repetitions for an aggregation level of eight ECCEs, and with eight repetitions for an aggregation level of sixteen ECCEs.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for a user equipment (UE) to receive control information, comprising:
    identifying a downlink bandwidth and a downlink control information (DCI) format to be monitored;
    identifying an aggregation level based on the identified downlink bandwidth, the identified DCI format, and a number of physical resource block (PRB) pairs; and
    receiving control information based on the identified aggregation level.

2. The method of claim 1, wherein the number of PRB pairs is configured to the UE.

3. The method of claim 1, wherein the identified aggregation level comprises a UE-specific search space.

4. The method of claim 1, wherein the identifying of the aggregation level is performed based on comparing the identified downlink bandwidth with a predefined value.

5. A method for a base station to transmit control information, comprising:
    transmitting control information,
    wherein the control information is received by a user equipment (UE) based on an aggregation level, and
    wherein the aggregation level is identified by the UE based on a downlink bandwidth, a downlink control information (DCI) format to be monitored, and a number of physical resource block (PRB) pairs.

6. The method of claim 5, wherein the number of PRB pairs is configured to the UE.

7. The method of claim 5, wherein the identified aggregation level comprises a UE-specific search space.

8. The method of claim 5, wherein the aggregation level is identified based on comparing the identified downlink bandwidth with a predefined value.

9. A user equipment (UE) to receive control information, comprising:
    a controller configured to identify a downlink bandwidth and a downlink control information (DCI) format to be monitored, and identify an aggregation level based on the identified downlink bandwidth, the identified DCI format, and a number of physical resource block (PRB) pairs; and
    a transceiver configured to receive control information based on the identified aggregation level.

10. The UE of claim 9, wherein the number of PRB pairs is configured to the UE.

11. The UE of claim 9, wherein the identified aggregation level comprises a UE-specific search space.

12. The UE of claim 9, wherein the controller is configured to identify the aggregation level based on comparing the identified downlink bandwidth with a predefined value.

13. A base station to transmit control information, comprising:
    a transceiver configured to transmitting control information,
    wherein the control information is received by a user equipment (UE) based on an aggregation level, and
    wherein the aggregation level is identified by the UE based on a downlink bandwidth, a downlink control information (DCI) format to be monitored, and a number of physical resource block (PRB) pairs.

14. The base station of claim 13 wherein the number of PRB pairs is configured to the UE.

15. The base station of claim 13, wherein the identified aggregation level comprises a UE-specific search space.

16. The base station of claim 13, wherein the aggregation level is identified based on comparing the identified downlink bandwidth with a predefined value.

\* \* \* \* \*